(12) United States Patent
Barcatta

(10) Patent No.: US 9,185,856 B1
(45) Date of Patent: Nov. 17, 2015

(54) LIQUID FLOW RATE MODULATOR

(71) Applicant: Frank August Barcatta, Fallbrook, CA (US)

(72) Inventor: Frank August Barcatta, Fallbrook, CA (US)

( * ) Notice: Subject to any disclaimer, the term of this patent is extended or adjusted under 35 U.S.C. 154(b) by 0 days.

(21) Appl. No.: 14/318,596

(22) Filed: Jun. 28, 2014

(51) Int. Cl.
   F15D 1/02 (2006.01)
   A01G 25/16 (2006.01)
   F16K 31/06 (2006.01)
   F16K 31/04 (2006.01)

(52) U.S. Cl.
   CPC ............ A01G 25/165 (2013.01); F16K 31/041 (2013.01); F16K 31/06 (2013.01)

(58) Field of Classification Search
   CPC .......... F16K 3/32; F16K 5/10; F16K 31/041; F16K 31/06; F02K 7/10; F02K 7/18; A01G 25/165
   USPC ........ 138/45, 46; 239/265.15, 265.13, 63, 70, 239/71, 240; 700/284, 282; 251/129.11
   See application file for complete search history.

(56) References Cited

U.S. PATENT DOCUMENTS

| | | | | |
|---|---|---|---|---|
| 588,415 A | * | 8/1897 | Foster | 138/46 |
| 3,970,253 A | * | 7/1976 | Burkes et al. | 239/265.19 |
| 4,130,128 A | * | 12/1978 | Kaneko | 137/269 |
| 4,704,912 A | * | 11/1987 | Payne | 74/89.23 |
| 4,724,869 A | * | 2/1988 | Carter | 138/45 |
| 4,948,050 A | * | 8/1990 | Picot | 239/171 |
| 5,016,673 A | * | 5/1991 | Carter et al. | 138/45 |
| 5,337,957 A | * | 8/1994 | Olson | 239/63 |
| 5,782,410 A | * | 7/1998 | Weston | B05B 12/085 239/583 |
| 5,947,157 A | * | 9/1999 | Kindersley | 138/45 |
| 6,402,048 B1 | * | 6/2002 | Collins | B05B 3/02 239/210 |
| 6,717,383 B1 | * | 4/2004 | Brunt et al. | 318/723 |
| 6,892,698 B2 | * | 5/2005 | Kino et al. | 123/337 |
| 7,494,070 B2 | * | 2/2009 | Collins | B05B 3/02 239/101 |
| 8,734,120 B2 | * | 5/2014 | Giewont et al. | 417/45 |
| 2005/0051134 A1 | * | 3/2005 | Valascho et al. | 123/399 |
| 2008/0011269 A1 | * | 1/2008 | Tanimura et al. | 123/337 |
| 2011/0175006 A1 | * | 7/2011 | Dolenti et al. | 251/129.11 |

* cited by examiner

Primary Examiner — Patrick F Brinson

(57) ABSTRACT

This invention, through an arrangement of basic elements, has resulted in a new device for landscape irrigation which has not been previously available. This implementation is an electromechanical device which can potentially revolutionalize the entire landscape irrigation industry. During operation it cyclically varies the amount of water ejected from a sprinkler device and thereby provides a more uniform coverage than is ordinarily available. This obviates the necessity to have additional sprinklers fill in the under-watered areas. The device accomplishes this by utilizing a synchronous alternating current motor to drive a rotor which, as it rotates, varies the flow rate of the water to the sprinklers. The motor is powered by the same source that powers the valves feeding water to the sprinklers. Its use will drastically reduce the amount of irrigation water required, helping to save a precious resource.

8 Claims, 13 Drawing Sheets

CROSS SECTION VIEW
MAGNETICALLY COUPLED UNIT

FLOW VERSUS ROTOR POSITION
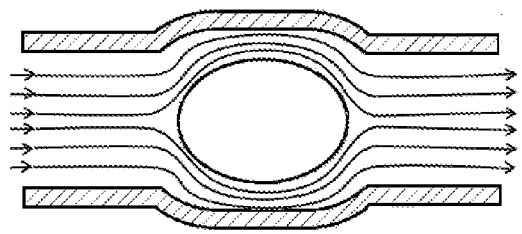
MAXIMUM FLOW
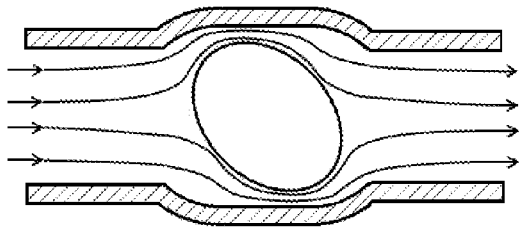
INTERMEDIATE FLOW
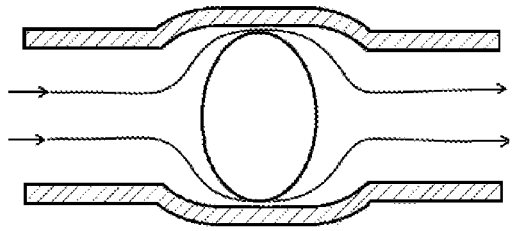
MINIMUM FLOW
Fig 9

Comparison 1
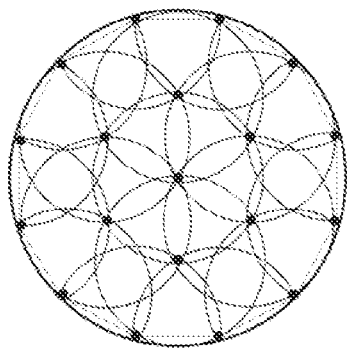
19 SPRINKLERS
WITHOUT MODULATION
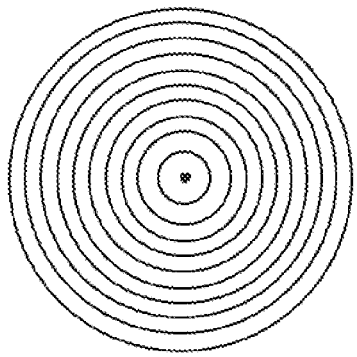
1 SPRINKLER
WITH MODULATION
Fig 13
Comparison 2
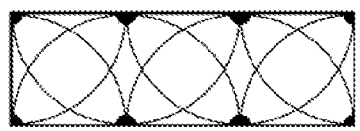
8 SPRINKLERS
WITHOUT MODULATION
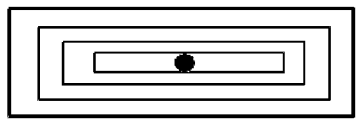
1 RECTANGULAR SPRINKLER
WITH MODULATION
Fig 14

LIQUID FLOW RATE MODULATOR

BACKGROUND

Irrigation specialists have struggled over the years on ways to apply a uniform layer of water to a particular area. A longtime irrigation industry goal has been to achieve a uniformity of ninety percent. That is, the depth of water deposited over an irrigated area would vary less than ten percent. In an attempt to achieve this goal, manufacturers have developed a dizzying array of products, literally hundreds of sprinkler heads, pop-up and fixed sprinkler bodies, various valves and controllers etc, etc, etc. As a result, in-ground sprinkler layouts have become quite complex, requiring many sprinklers, valves and a network of tubing. Nowadays a degree in Irrigationology is required just to install a few sprinklers in your front yard. It should not have to be akin to rocket science. As a recreational gardener I have been frustrated by the current state of affairs and as a result I have developed the Liquid Flow Rate Modulator. This device goes a long way toward simplifying sprinkler layouts. I have achieved uniformities greater than ninety percent in tests with a prototype. And perhaps, even more importantly, it saves water! Used on a large scale across the country it could save untold quantities of water, and particularly in the western states where drought conditions persist and appear to be worsening.

SUMMARY

The Liquid Flowrate Modulator described in this specification is a device which will drastically alter the irrigation industry. It simplifies irrigation systems by allowing fewer components to be used, and provides for the deposition of a more uniform layer of water, thereby saving water. The liquid flow rate modulator accomplishes this by altering, on a regular basis during a watering cycle, the amount of water that flows through an irrigation system. The result is that the throw distance of water from any particular sprinkler varies from a minimum to a maximum and thereby uniformly covers the intervening area between the minimum and maximum throw positions as the flow rate is varied. Said another way, for example, a sprinkler having a circular pattern would deposit a uniform layer of water throughout the entire area of the circle, eliminating the need for an adjacent sprinkler to fill in underwatered areas, as is now usually the case. The modulation is accomplished by slowly rotating a specially designed rotor at a speed of the order of one revolution per minute. The rotor allows more or less water to pass depending on its position. A geared motor is employed to drive the rotor and has a driving voltage and current that is compatible with current valve controllers. The modulator unit can therefore be driven through the same circuit that drives the control valve or it can be driven by an auxiliary output that is available on most controllers.

FIGURES

Figure 4A:
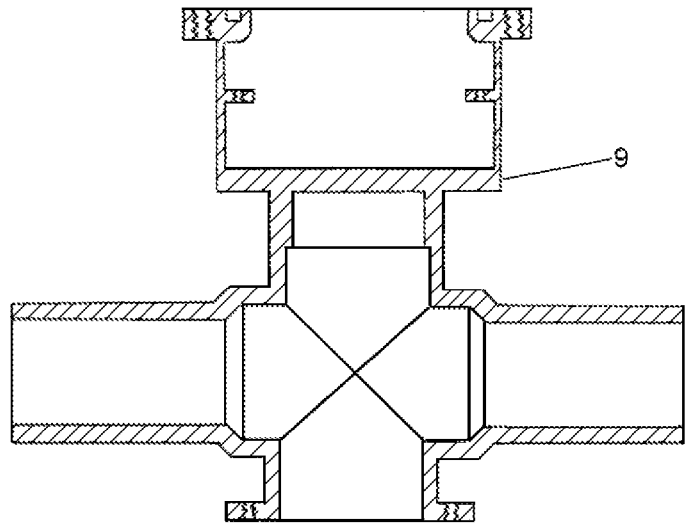
Figure 4B:
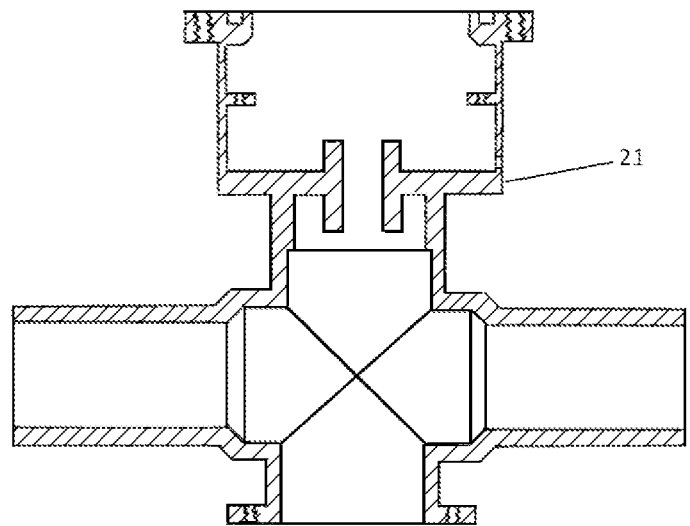

FIGS. 4*a* and 4*b* are sectional views of the two bodies described herein.

Figure 5:
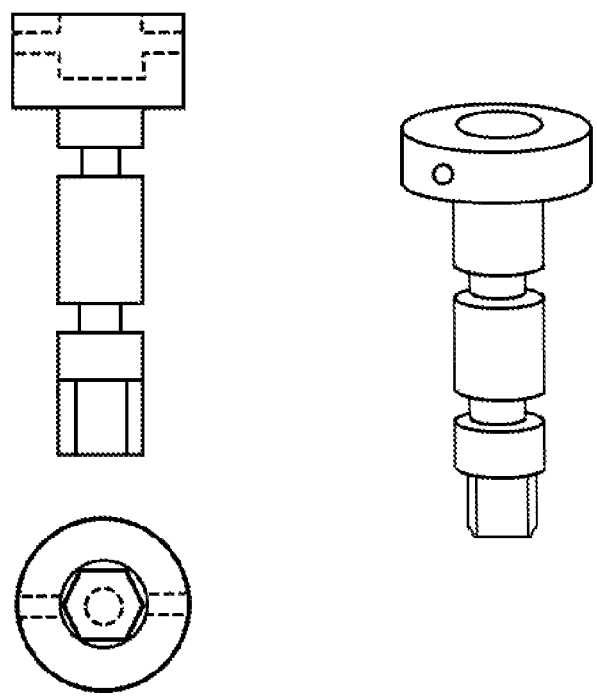

FIG. 5 shows details of the direct drive shaft.

Figure 6:
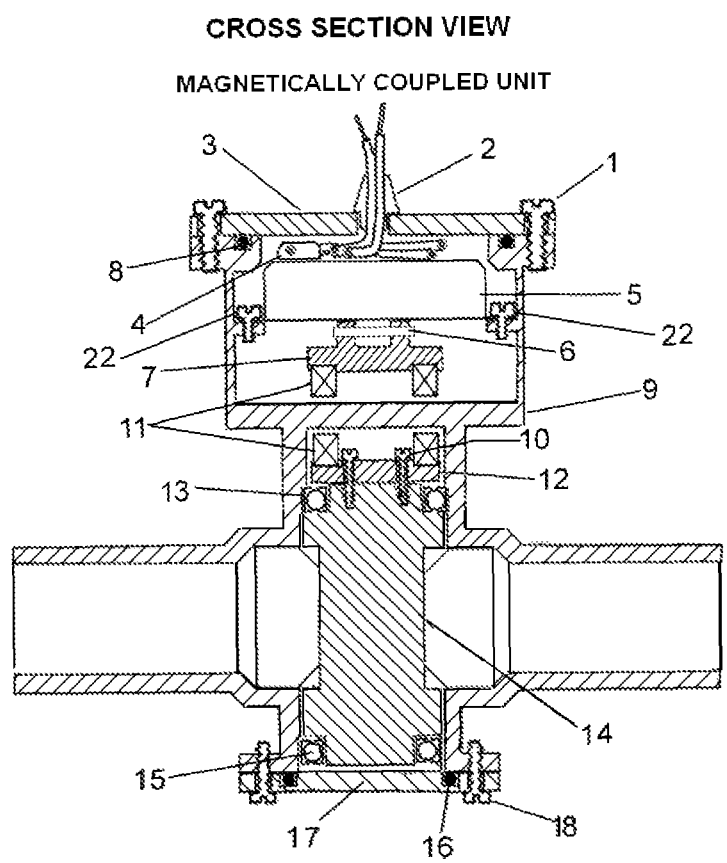

FIG. 6 shows a cross sectional view of the magnetically coupled drive unit.

Figure 7:
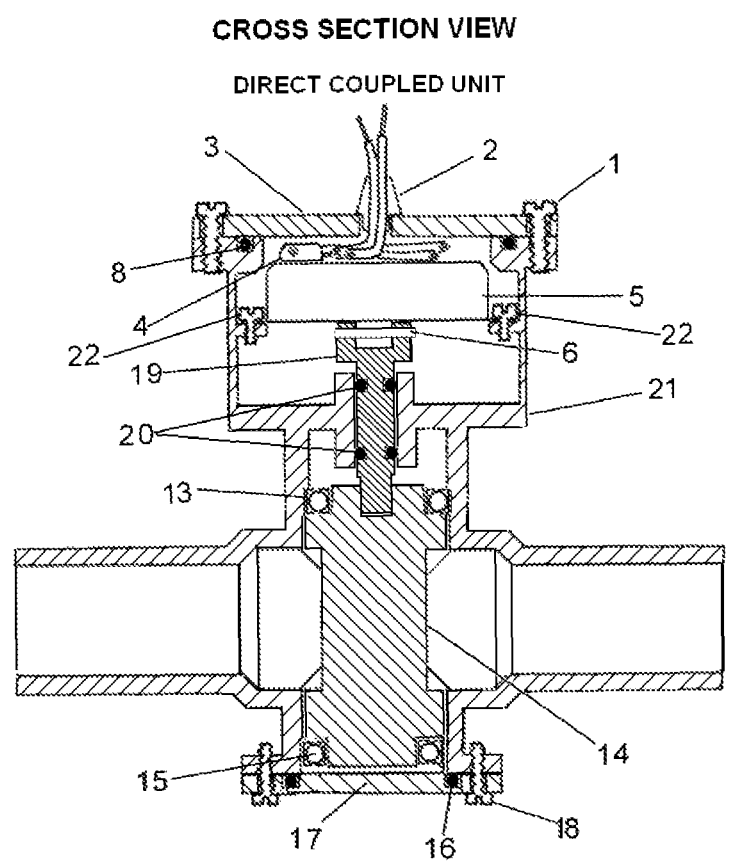

FIG. 7 shows a cross sectional view of the direct drive unit

Figure 8:
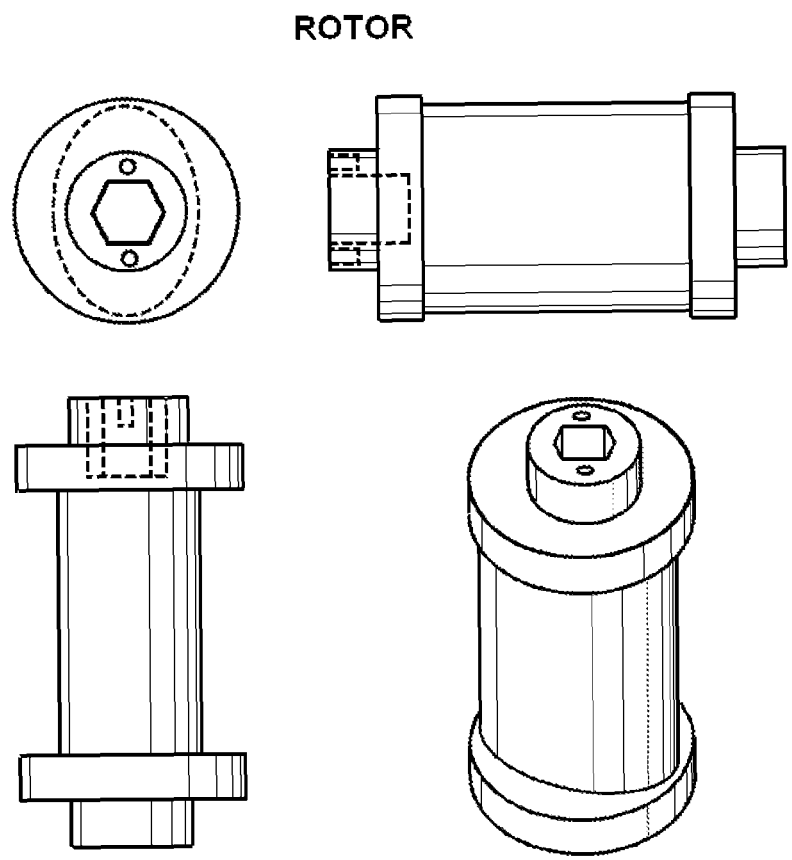

FIG. 8 presents several views of the modulating rotor.

FIG. 9 graphically depicts the flow rate as a function of rotor position.

Figure 10:
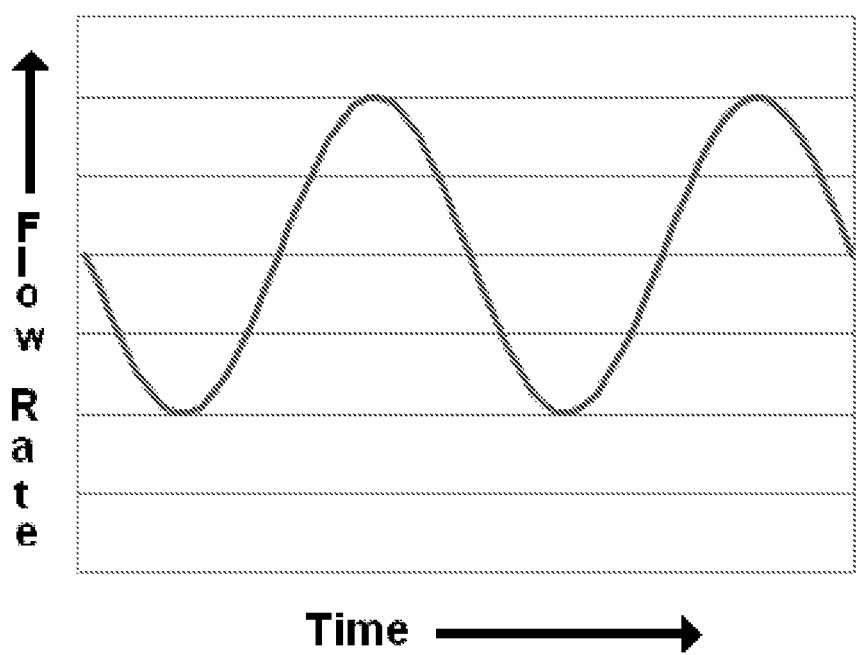

FIG. 10 is a graph of the flow rate as a function of time.

Figure 11:
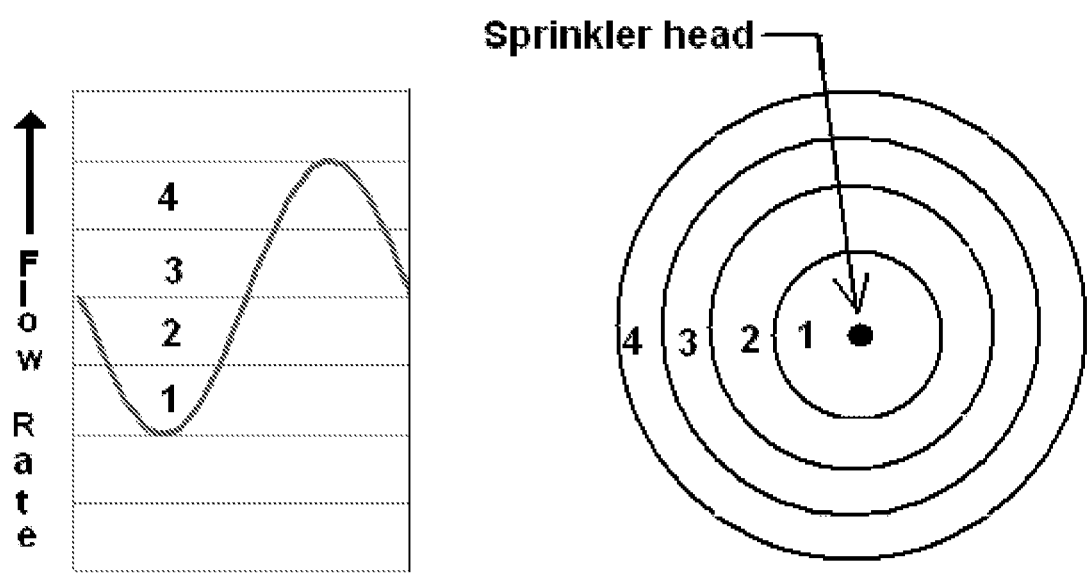

FIG. 11 is a graph showing coverage as a function of flow rate.

Figure 12:
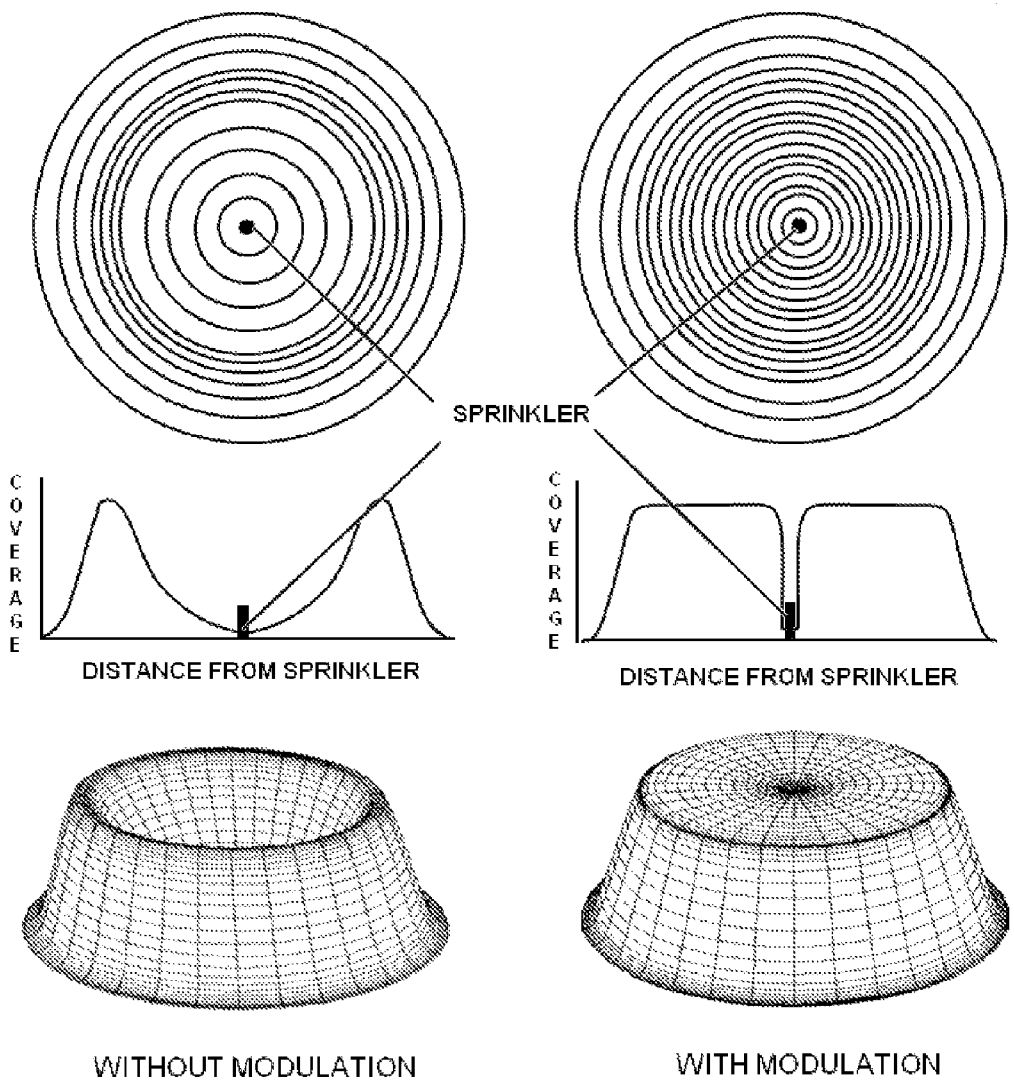

FIG. 12 shows coverage as a function of distance from the sprinkler head.

FIG. 13 compares sprinkler arrangements with and without modulation.

FIG. 14 is a second comparison with and without modulation.

DETAILED DESCRIPTION

General Discussion

Figure 1:
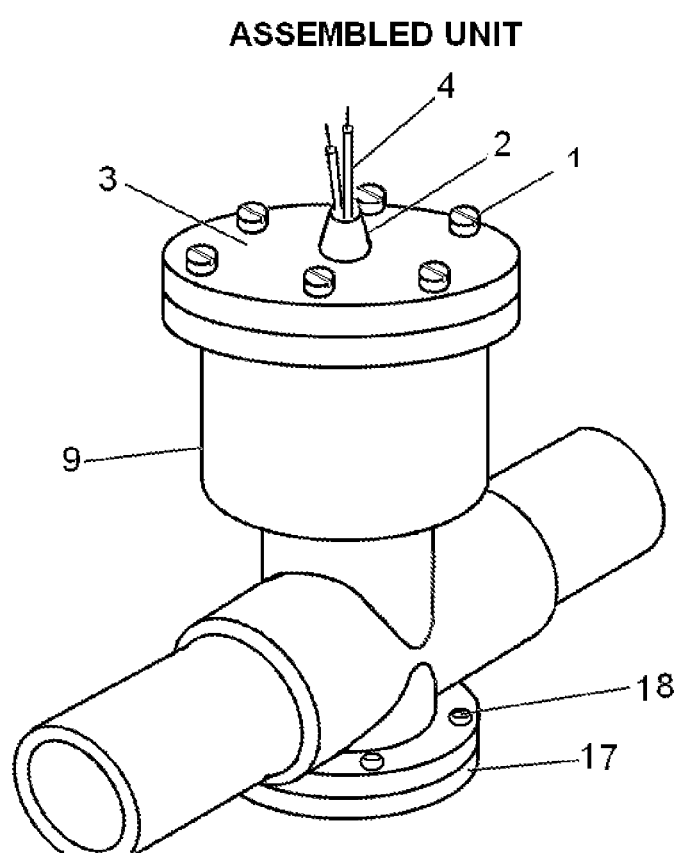
FIG. 1 is a view of the assembled unit.

An overall exterior view of the Liquid Flowrate Modulator is depicted in FIG. 1. Two versions of the unit are described in this specification: one being a magnetically coupled drive unit and the second a direct drive unit. Both appear the same on the outside. The advantage of the magnetically coupled unit is that it is completely sealed, and therefore can be operated in any orientation and also can be installed underground if desired. The advantage of the direct coupled unit is that requires fewer and less expensive parts to manufacture but; it must be installed above ground to allow for periodic maintenance if required. It is envisioned that the units will be manufactured mostly from PVC to be compatible with existing irrigation products. The figures in this specification depict a unit that would be compatible with a one inch PVC irrigation system, but it could be made larger or smaller depending on the expected use. The essence of this invention is that by varying the flow rate of the water to the sprinklers connected to the unit the throw distance of any particular sprinkler is varied, going from near zero to the maximum distance available for that sprinkler, and in doing so covers all of the area uniformly. The necessity for additional adjacent sprinklers to fill in the missed areas is obviated.

Assembly

Figure 2:
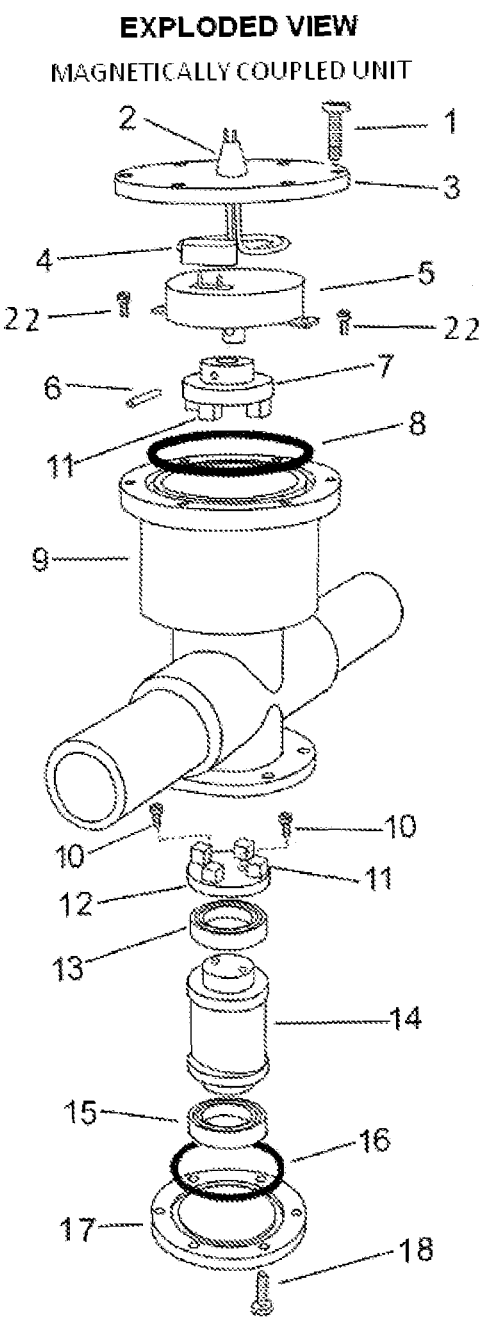
FIG. 2 is an exploded view showing all of the elements of the magnetically coupled drive unit.

FIG. 2 shows an exploded view of the magnetically coupled drive unit. The magnetic drive body 9 is a one piece molded PVC unit whose upper compartment is completely sealed from the lower compartment. FIG. 4*a* shows a cross section of the magnetic drive body 9. The upper compartment houses the drive motor 5 which is a geared 28 volt synchronous motor having an output rotational speed of about one revolution per minute. The speed can be adjusted by the manufacturer to meet specific needs. The drive motor 5 is electrically powered through the connector assembly 4 whose electrical leads pass outward through the seal 2 in the top cover 3. The leads can be connected to the auxiliary/pump output on a sprinkler controller or connected in parallel with a control valve. The upper magnet carrier 7, which is fabricated of soft iron to confine the magnetic field, is attached to the output shaft of the drive motor 5 with roll pin 6. The neodymium magnets 11 are bonded to the upper magnet carrier 7 with a high strength waterproof adhesive. The subassembly comprising items 5, 6, 7, and 11 are mounted within the upper compartment of the magnetic drive body 9 as shown in FIG. 4*a* through screw attachments on the drive motor 5 using motor attachment screws 22. After installation, the upper compartment of the body 9 is sealed; by first connecting the connector assembly 4 to the drive motor 5, and then placing the upper o-ring 8 in its groove, and finally attaching the top cover 3 with the six top screws 1. Within the lower compartment of the magnetic drive body 9 there is the lower magnet carrier 12, with its neodymium magnets 11 bonded there to. The Lower magnet carrier 12 is attached to the modulating rotor 14 with the two retaining screws 10. Located between the lower magnet carrier 12 and the modulating rotor 14 is the upper ball bearing 13. A second bearing, the lower ball bearing 15, is used to stabilize the lower end of the modulating rotor 14. The subassembly comprising items 10, 11, 12, 13, 14, and 15 are inserted into the lower compartment of the body 9, and held in place by the lower cover 17. The lower o-ring 16, fitting into the groove of the lower cover 17, seals the lower compartment. The lower cover 17, with the lower o-ring 16 in place, is attached to the body 9 with the six bottom screws 18. FIG. 6 shows a cross-sectional view of the assembled unit.

Figure 3:
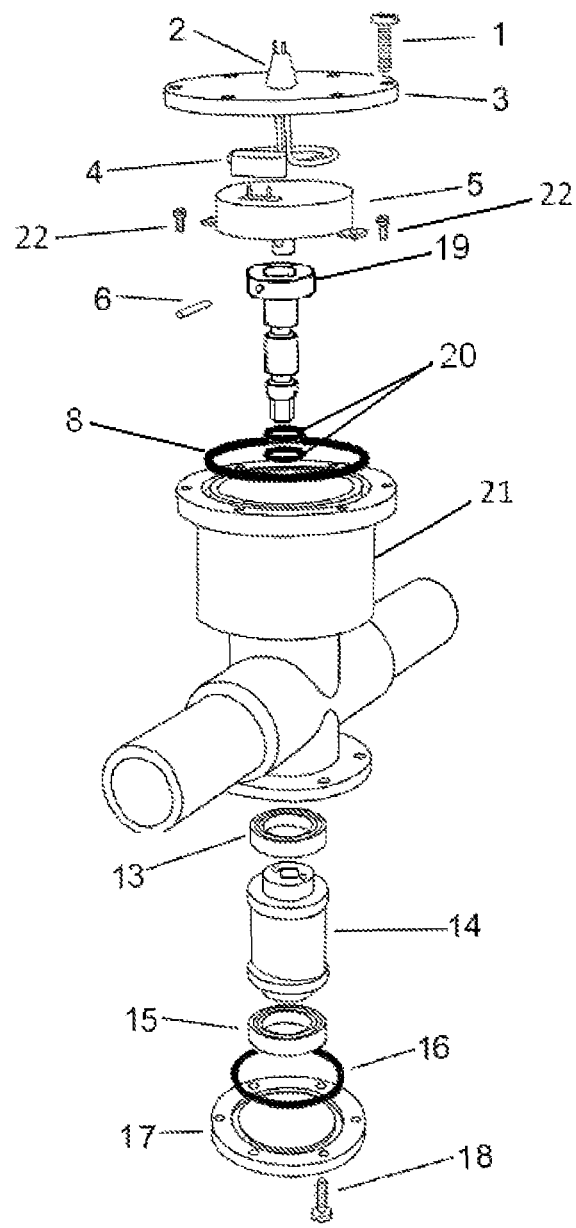
FIG. 3 is an exploded view showing all of the elements of the direct drive unit.

FIG. 3 depicts the exploded view of the direct coupled drive unit with FIG. 4b showing the direct drive body 21. Assembly is much the same as the magnetically coupled unit, except the upper magnet carrier 7 and its neodymium magnets 11 and the lower magnet carrier 12 with its neodymium magnets 11 (shown in FIG. 2) are all replaced with the direct drive shaft 19 and the associated sealing o-rings 20. The direct drive shaft 19 is attached to the output shaft of the drive motor 5 with roll pin 6. Sealing o-rings 20 are positioned in the grooves of the direct drive shaft 19, and the subassembly comprising items 5, 6, 19, and 20 are inserted through the opening between the upper and lower compartments of the direct drive body 21 which is shown in FIG. 4b. The drive motor 5 is attached to the direct drive body 21 using the motor attachment screws 22. After installation, the upper compartment of the body 21 is sealed by first connecting the connector assembly 4 to the drive motor 5, then placing the upper o-ring 8 in its groove and finally attaching the top cover 3 with the six top screws 1. The modulating rotor 14, with the upper ball bearing 13 and the lower ball Bearing 15 pressed in place, as shown in FIG. 7, is inserted within the lower compartment of the Body 21. The hexagonal recess in the top of the modulating rotor 14, as shown in FIG. 8, is inserted over the hexagonal extension of the direct drive shaft 19, which is shown in FIG. 5. The assembly of the lower compartment is completed by attaching the lower cover 17 and lower o-ring 16 with the six bottom screws 18.

In both configurations, as depicted in FIG. 6 and FIG. 7, a small radial clearance is required between the cylindrical sections of the modulating rotor 14 and the bodies 9 and 21, in order to accommodate any play in the upper ball bearing 13 and the lower ball bearing 15. During operation a significant force is applied to the modulating rotor 14 due to the static and dynamic pressure of the water flowing in the system. For example, for a one inch system forces up to 100 pounds or greater can be encountered, depending on the inlet line pressure. If the radial clearance is not adequate, interference with the body will occur and prevent the rotor from turning. Therefore, the play in the bearings must be considered when sizing the outer diameter of the modulating rotor 14. Bearings of either all stainless steel, or plastic with glass balls, should be used to assure corrosion resistance.

Operation

When a 28 volt AC current is applied to the liquid flow rate modulator, either in parallel with a control valve or independently through the auxiliary output of a valve controller, rotation of the modulating rotor 14 commences. As observed on FIG. 8, the modulating rotor 14 contains a center portion which is not cylindrical in shape but is modified to allow water to pass. An elliptical shape is shown, but alternate shapes can be accommodated depending on the desired flow pattern. For example, tailoring of the shape could be done to allow more time to be spent at the maximum flow condition or at the minimum flow condition, or somewhere in between; all with the goal of improving uniformity of coverage. FIG. 9 shows how the flow rate goes from a maximum flow to a minimum flow as the modulating rotor 14 turns. FIG. 10 further illustrates the variation of the flow rate with time. A smooth variation is shown but the variation could be more irregular depending upon the tailoring of the modulating rotor 14, as discussed above. The throw distance (area watered) by a particular sprinkler moves from a maximum to a minimum distance completely filling in the area between the two extremes. FIG. 11 reinforces this concept. For example, when the flow rate is low, area 1 is being watered and then progressively areas 2, 3, and 4 are irrigated. That is the essence of this invention; the ability to fill the entire area with a uniform layer of water with one sprinkler head. One or more additional sprinklers are not required to fill in the under-watered areas. And again, FIG. 12 further compares the coverage without and with modulation.

Dramatic reductions in the complexity of sprinkler layouts and dramatic improvements in uniformity result from the use of this device. The end result is a dramatic reduction in water usage. Two figures, FIG. 13 and FIG. 14, illustrate what can be accomplished with the Liquid Flow Rate Modulator. Manufacture's recommendations for sprinkler layouts are compared with those achievable with modulation; from 19 sprinklers to 1 sprinkler in one case, and from 8 sprinklers to 1 sprinkler in the second case. That is quite an improvement in complexity and also a tremendous improvement in uniformity.

I claim:

1. A liquid flow rate modulator used in an irrigation system, the modulator comprising:
    a magnetic drive body comprising an upper compartment and a lower compartment, the lower compartment being completely sealed from the upper compartment;
    said upper compartment housing a drive motor electrically connected to a sprinkler controller or control valve located outside of the magnetic drive body, said drive motor including an output shaft; said upper compartment further includes an upper magnet carrier having an upper surface connected to the motor output shaft and a lower surface to which is connected a first plurality of magnets;
    said lower compartment housing a lower magnet carrier having an upper surface connected to a second plurality of magnets and a lower surface to which is connected a sculptured modulating rotor, said rotor being supported by corrosion resistant bearings to allow free motion under static and dynamic water pressure loading, wherein said sculptured modulating rotor rotates continuously throughout a watering cycle in response to the drive motor and magnets to alter, on a regular basis, the amount of water that flows through the irrigation system, and thus, vary the throw distance of water from any particular sprinkler.

2. A liquid flow rate modulator, according to claim 1, wherein the drive motor is a geared 28 volt synchronous motor having a rotational speed of about one evolution per minute.

3. A liquid flow rate modulator, according to claim 1, wherein first and second plurality of magnets attached to the upper and lower magnetic carriers, respectively, are neodymium magnets.

4. A liquid flow rate modulator, according to claim 3, wherein the neodymium magnets are bonded to the upper and lower magnetic carriers with a high strength waterproof adhesive.

5. A liquid flow rate modulator, according to claim 1, wherein the corrosion resistant bearings include upper ball bearings located between the lower magnet carrier and the modulating rotor and lower ball bearings used to stabilize the lower end of the modulating rotor.

6. A liquid flow rate modulator used in an irrigation system, the modulator comprising:

A direct drive body comprising an upper compartment and a lower compartment, said upper compartment housing a drive motor electrically connected to the sprinkler controller or control valve located outside of the direct drive body, said drive motor including an output shaft; said upper compartment further housing the upper portion of the direct drive shaft which is attached to the output shaft of the drive motor, said lower compartment housing the lower portion of said direct drive shaft which is directly attached to a sculptured modulating rotor, wherein the direct drive shaft extends between upper and lower compartments with dual o rings positioned in grooves on the middle portion of the direct drive shaft to provide a seal between upper and lower compartments; said rotor being supported by corrosion resistant bearings to allow free motion under static and dynamic water pressure loading, wherein said sculptured modulating rotor rotates continuously throughout a watering cycle in response to the drive motor to alter, on a regular basis, the amount of water that flows through the irrigation system, and thus, vary the throw distance of water from any particular connected sprinkler.

7. A liquid flow rate modulator, according to claim 6, wherein the direct drive shaft is attached to the motor output shaft with a roll pin.

8. A liquid flow rate modulator, according to claim 6, wherein the corrosion resistant bearings include upper and lower ball bearings to stabilize the rotor within the lower compartment of the drive body.

* * * * *